(12) United States Patent
Lalancette et al.

(10) Patent No.: US 7,449,633 B2
(45) Date of Patent: Nov. 11, 2008

(54) ELECTRICAL BOX FOR CONCRETE WALLS

(75) Inventors: Daniel Lalancette, St-Jean-sur Richelieu (CA); Ioan Liviu Lupsa, Dollard-des-Ormeaux (CA)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/512,473

(22) Filed: Aug. 30, 2006

(65) Prior Publication Data

US 2007/0044986 A1    Mar. 1, 2007

Related U.S. Application Data

(60) Provisional application No. 60/712,777, filed on Aug. 31, 2005.

(51) Int. Cl.
*H02G 3/08* (2006.01)
(52) U.S. Cl. .............. 174/58; 174/50; 174/57; 220/4.02; 439/535; 248/906
(58) Field of Classification Search ............ 174/58, 174/57, 50; 220/4.02; 439/535; 248/906; 361/826

See application file for complete search history.

(56) References Cited

U.S. PATENT DOCUMENTS

| | | | |
|---|---|---|---|
| 1,161,739 A | 11/1915 | Smith | |
| 2,510,745 A | 6/1950 | Kilgore | |
| 2,514,745 A | 7/1950 | Dalzell | |
| 2,757,817 A | 8/1956 | Egan | |
| 2,983,399 A | 5/1961 | Slater et al. | |
| 3,343,704 A | 9/1967 | Terry | |
| 3,609,210 A | 9/1971 | Guritz | |
| 3,689,626 A | 9/1972 | Scott | |
| 3,917,899 A | 11/1975 | Oliver | |
| 4,098,423 A | 7/1978 | Marrero | |
| 4,109,095 A | 8/1978 | Kling et al. | |
| 4,145,857 A | 3/1979 | Tilsen | |
| 4,202,457 A * | 5/1980 | Tansi | 220/3.3 |
| 4,276,730 A | 7/1981 | Lewis | |
| 4,306,109 A * | 12/1981 | Nattel | 174/51 |
| 4,320,606 A | 3/1982 | GangaRao | |
| 4,331,832 A | 5/1982 | Curtis et al. | |
| 4,424,407 A | 1/1984 | Barbic | |
| 4,443,654 A | 4/1984 | Flachbarth et al. | |
| 4,458,460 A | 7/1984 | Kohaut | |
| 4,548,007 A | 10/1985 | Newman | |
| 4,603,789 A | 8/1986 | Medlin, Sr. | |

(Continued)

FOREIGN PATENT DOCUMENTS

CA    1260129    *    9/1989

(Continued)

*Primary Examiner*—Dhiru R Patel
(74) *Attorney, Agent, or Firm*—Hoffmann & Baron, LLP (57) ABSTRACT

An electrical outlet box for accommodating an electrical fixture includes a generally rectangular box having a back wall, a perimetrical side wall surrounding said back wall defining an open front face and a box interior, said side wall includes of a first and second set of generally parallel spaced apart wall portions; and a slidable extension nested within said generally rectangular box, that can be moved from within the generally rectangular box to an extended position beyond the open front face.

8 Claims, 11 Drawing Sheets

U.S. PATENT DOCUMENTS

| | | | |
|---|---|---|---|
| 4,603,932 A | 8/1986 | Heverly | |
| 4,605,817 A | 8/1986 | Lopez | |
| 4,634,015 A | 1/1987 | Taylor | |
| 4,674,646 A | 6/1987 | Teron | |
| 4,803,307 A | 2/1989 | Shotey | |
| 4,918,259 A | 4/1990 | Hanson | |
| 4,931,597 A | 6/1990 | Kimbrough et al. | |
| 4,988,832 A | 1/1991 | Shotey | |
| 5,012,043 A | 4/1991 | Seymour | |
| 5,042,673 A | 8/1991 | McShane | |
| 5,088,246 A | 2/1992 | Brown | |
| 5,117,996 A | 6/1992 | McShane | |
| 5,119,606 A | 6/1992 | Graham | |
| 5,169,013 A | 12/1992 | Lammens, Jr. | |
| 5,171,939 A | 12/1992 | Shotey | |
| 5,222,338 A | 6/1993 | Hull et al. | |
| 5,223,673 A | 6/1993 | Mason | |
| 5,248,122 A | 9/1993 | Graham | |
| 5,293,003 A | 3/1994 | Prairie, Jr. | |
| 5,350,884 A | 9/1994 | Littrell | |
| 5,388,995 A * | 2/1995 | Rudy et al. | 439/61 |
| 5,420,376 A | 5/1995 | Rajecki et al. | |
| 5,434,359 A | 7/1995 | Schnell | |
| 5,466,886 A | 11/1995 | Lengyel et al. | |
| 5,486,650 A * | 1/1996 | Yetter | 174/53 |
| 5,509,560 A | 4/1996 | Nash | |
| 5,553,730 A | 9/1996 | Kohnen | |
| 5,661,264 A | 8/1997 | Reiker | |
| 5,679,924 A | 10/1997 | Young et al. | |
| 5,683,005 A | 11/1997 | Mordick | |
| 5,778,625 A | 7/1998 | Druffel et al. | |
| 5,831,212 A | 11/1998 | Whitehead et al. | |
| 5,883,331 A | 3/1999 | Reiker | |
| 5,906,287 A | 5/1999 | Kohnen | |
| 5,931,325 A | 8/1999 | Filipov | |
| 5,950,396 A | 9/1999 | Fosdick, Jr. | |
| 5,967,354 A | 10/1999 | Whitehead et al. | |
| 6,061,983 A | 5/2000 | McCleskey | |
| 6,096,972 A | 8/2000 | Bowman et al. | |
| 6,098,825 A | 8/2000 | Kohnen | |
| 6,112,927 A | 9/2000 | Gretz | |
| 6,167,671 B1 | 1/2001 | Wilson | |
| 6,172,298 B1 | 1/2001 | Norvelle | |
| 6,207,894 B1 | 3/2001 | Reiker | |
| 6,239,368 B1 | 5/2001 | Gretz | |
| 6,307,154 B1 | 10/2001 | Gretz | |
| 6,346,674 B1 | 2/2002 | Gretz | |
| 6,504,730 B1 * | 1/2003 | Cooney et al. | 361/826 |
| 6,578,321 B2 | 6/2003 | Layne | |
| 6,737,576 B1 | 5/2004 | Dinh | |

FOREIGN PATENT DOCUMENTS

| | | |
|---|---|---|
| CA | 2129595 | 8/1994 |
| CA | 2296872 | 1/2000 |
| CA | 2472915 | 7/2004 |
| CA | 2477213 | 8/2004 |
| DE | 94 08 437.8 | 5/1994 |
| GB | 1161739 | 8/1966 |
| GB | 1355184 | 6/1970 |
| GB | 1344590 | 2/1972 |
| GB | 2248866 A | 4/1992 |
| JP | 10 077 711 | 3/1998 |
| WO | WO 91/12461 | 8/1991 |
| WO | WO 00/14760 | 3/2000 |
| WO | WO 03/085792 | 10/2003 |
| WO | WO 03/104587 | 12/2003 |

* cited by examiner

ELECTRICAL BOX FOR CONCRETE WALLS

CROSS-REFERENCE TO RELATED APPLICATIONS

This application claims the benefit of U.S. Provisional Application No. 60/712,777 filed on Aug. 31, 2005, entitled "Electrical Box For Concrete Walls".

FIELD OF THE INVENTION

The present invention relates generally to an electrical outlet box for housing electrical fixtures such as a switch or a receptacle. More particularly, the present invention relates to an improved electrical outlet box for use on concrete wall.

BACKGROUND OF THE INVENTION

It has long been known to house electrical fixtures such as switches and receptacles in an electrical outlet box. The outlet box permits the insertion of electrical wires into the box which are terminated to electrical fixtures. The fixtures then may be mounted to the box which provides protection to the fixtures as well as the wires terminated therein. The outlet box is then mounted to a wall at a convenient location to provide access. Most outlet boxes accommodate one or more electrical fixtures, which terminate standard 110 volt electrical wires.

Outlet boxes are available in a variety of configurations and sizes. The selection of which type of box to use is dependant upon the specifics of the application. The most commonly employed box is a single-gang outlet box, also referred to as a standard outlet box. The single-gang box is ideal for applications in which only one receptacle is required for the application. Standard outlet boxes have opening dimensions of approximately 3"×2-¼" and are available in a variety of depths. Double-gang and triple-gang boxes are also available, and they typically have the capacity to hold two and three receptacles respectively. A four inch (4") square box is also commonly employed for multiple receptacle applications.

Typically, outlet boxes are mounted by affixing mounting ears to a wall stud or other structural member. However, for some applications, such as exterior uses, there is a requirement to install electrical boxes on poured concrete walls, wherein the outlet box, may be mounted within a concrete structure. This is accomplished by attaching the box to a form in the desired location. The form is usually a wooden temporary structure used to contain the poured concrete in the desired shape that is removed after the concrete has hardened. The outlet box remains in the concrete after removal of the form.

It is necessary when using an electrical box in such an application to insure that it is securely affixed to the form to resist being displaced during the concrete pour. Presently, electrical boxes used by many contractors for installation in concrete walls are not well adapted for use in concrete wall. Specifically, the prior art boxes lack features thereby making them difficult to use in concrete wall applications, or result in additional work for the contractor. For example, many prior art boxes lack ears or other suitable attachment means for firmly and securely attaching the electrical box to the wooden form prior to pouring the concrete. This can result in the contractor having to use less than suitable means to attach the box to the form which can result in a misplaced box, or one that moved during the concrete pour and subsequently became filled with concrete that the contractor must remove in order to utilize the box.

Therefore, it would be desirable to have an electrical box for use in concrete walls, incorporating features for securely mounting the electrical box to a form, such that it remains stable and firmly attached to the form during the concrete pouring process. Additionally, it is desirable that the electrical box used in a concrete wall prevent infiltration of concrete into the interior of the box during the concrete pouring process, thereby preventing the box from becoming filled with concrete and thus unusable. It is further desirable that the electrical box can be easily modified to extend the open front perimeter of the box after the concrete is poured and hardened such that the perimeter will be flush with the finished wall surface to conform to electrical code requirements.

SUMMARY OF THE INVENTION

Applicant has overcome the shortcomings of prior art outlet box with the present invention by incorporating features for securely attaching the electrical box to a concrete form and further includes a built in extension device that can be pulled out from the front of the box to increase the depth of the box, once it is set in place without the need for attaching a separate extension.

The present invention therefore provides an electrical outlet box for accommodating an electrical fixture comprising a generally rectangular box having a back wall, a perimetrical side wall surrounding said back wall defining an open front face and a box interior, said side wall comprised of a first and second set of generally parallel spaced apart wall portions; and a slidable extension nested within said generally rectangular box, that can be moved from within the generally rectangular box to an extended position beyond the open front face.

DETAILED DESCRIPTION OF THE PREFERRED EMBODIMENTS

There will be detailed below the preferred embodiments of the present invention with reference to the accompanying drawings. Like members are designated by like reference characters in all figures.

Figure 1:
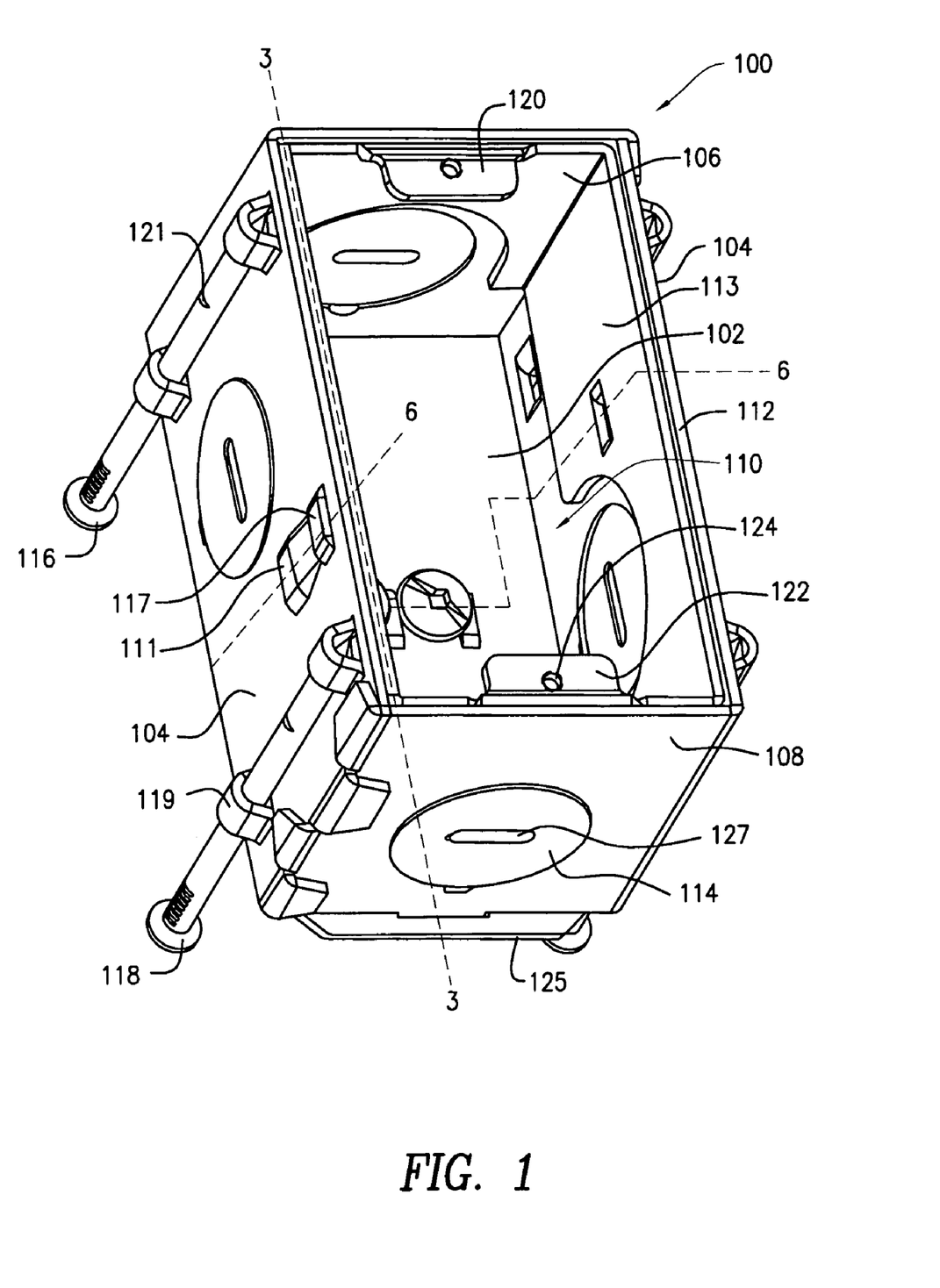
FIG. 1 is a perspective view of the electrical box according to the present invention, with the slide extension in a retracted position.

Turning now to FIG. 1, there is shown an embodiment of the outlet box of the present invention. It should be noted that the present invention is shown and described with respect to a single gang outlet box, however the invention can be adapted to multiple gang boxes such as for example a double or triple gang box. The single gang embodiment shown and described, is exemplary and not meant to be limiting to single gang version.

There is shown an outlet box 100 which is generally a rectangular member having a back wall 102, a pair of spaced apart side walls 104 extending from back wall 102, and opposed top and bottom walls 106 and 108. Back wall 102, side walls 104 and top and bottom walls 106 and 108 form a box interior 110 having an open front face 112 which accommodates therein an electrical fixture. Open front face 112 has a dimension substantially equivalent to the opening of a single-gang outlet box. The interior length and width of the opening will vary depending on if receptacle mounting flanges disposed on the box are interior or exterior to the box opening. However, the outlet box depicted here is illustrative and not intended to be limiting. It will be appreciated that it would be apparent to have an outlet box according to the present invention having alternate dimensions according to the application of such outlet box. Also visible in the interior of electrical box 100 is slideable extension 113. The extension 113 is shown in the retracted position within the box. As will be further shown and described with respect to FIG. 6, in the retracted position, the extension is held in place by protrusion 115 cooperatively engaging cavity 111. When the extension is pulled outside the box 100, the protrusion 115 snaps into a cavity 117 in side wall 104 and cooperatively engages the cavity 117 to lock the extension in place. Box 100 is provided with at least two cavities 111 for the retracted position and cavities 117 for the extended position on opposite side walls 104 which engage a similar number of protrusions 115 on extension 113.

As is well known in the art, outlet box 100 may include one or more access openings, typically known as knockouts 114 which permit entry of electrical wires and cables (not shown) into box interior 110. In addition, knockouts 114 include secondary smaller knockouts 115, centrally positioned on knockout 114. Knockout 127 is oval in shape and adapted to receive the blade of a straight blade screwdriver. Knockout 127 seals electrical box 100 against the infiltration of concrete during the pour. In use the installer of electrical box 100 would first remove knockout 127 with a straight blade screw driver, then insert the blade into the opening resulting from the removal of knockout 127 and pry out knockout 114.

The exterior surfaces of side walls 104 include nails 116 and 118 respectively which allow the box to be secured to a concrete form or the like by driving the nails into the form prior to the concrete being poured. The nails 116 and 118 are attached to the box 100 by collars 119, which permit the nails to slide with respect to the box 100. Therefore, the nails can be hammered forward into a form as the open front face 112 is pressed against a form. In addition, each nail 116, 118 is scored or notched 121 to create a stress raiser. The stress raiser is used to facilitate breaking the nail 116, 118 after the form has been removed and the electrical box 100 set in concrete. The score mark 121 is positioned along the nail's length such that it aligns with the open front face 112 when the nail is fully extended into the form. In that way, when the form is removed, the score mark is even with the cured concrete and can be broken off flush with the concrete wall. The interior surfaces of extension 113 include component retaining flanges 120 and 122 which include threaded apertures 124 for receiving fasteners, usually screws, to securely mount electrical components within the outlet box. In addition, flange 125 is provided, extending from back wall 102 beyond bottom wall 108 and top wall 106 (not visible in this view). Flange 125 provides an additional anchor point for the electrical box 100 to mechanically be affixed to the concrete.

Figure 2:
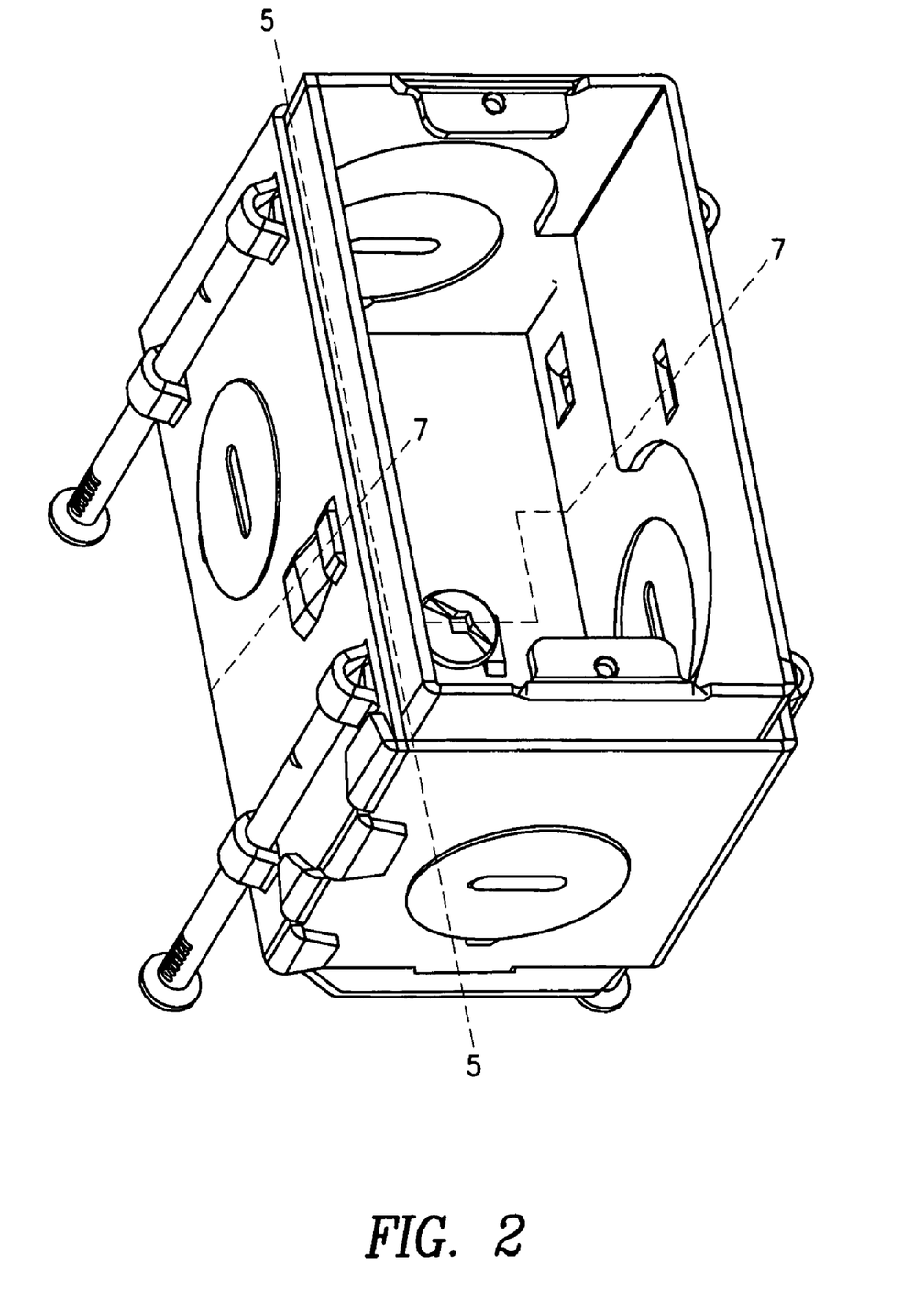
FIG. 2 is a perspective view of the electrical box according to the present invention, with the slide extension in an extended position.

Turning now to FIG. 2, there is shown the electrical box 100 according to the present invention wherein extension 113 is shown in the extended position. In the extended position, the extension 113, protrudes beyond open front face 112. By extending the extension 113, the protrusion 115 comes into cooperative alignment with cavity 117. The protrusion 115 then snaps into cavity 117 in side wall 104 and locks the extension 113 in place.

Figure 3:
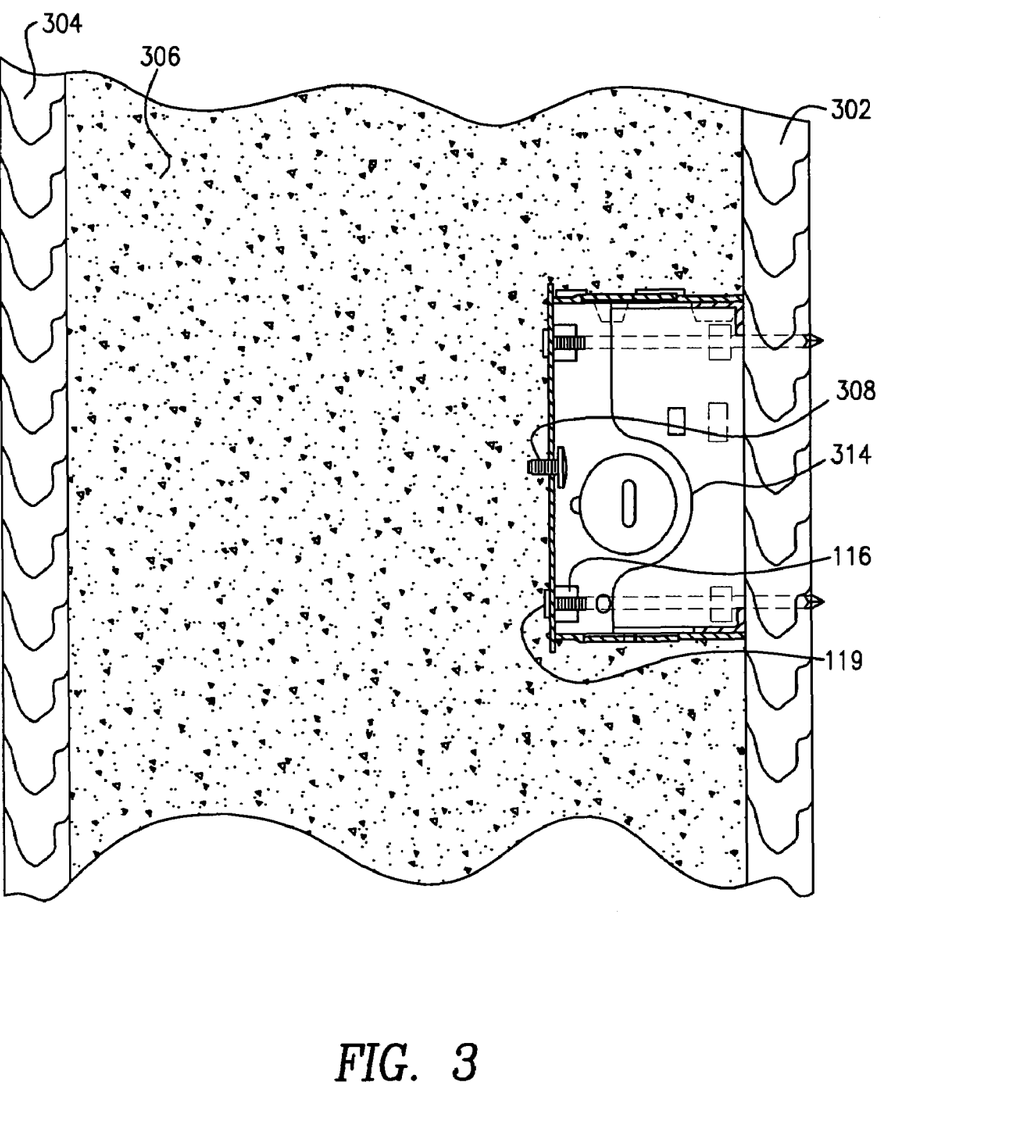
FIG. 3 is a cross sectional view of a typical installation of the electrical box of the current invention with the concrete forms in place along section 3-3 of FIG. 1.

Turning now to FIG. 3, there is shown a cross sectional view of the electrical box along section 3-3, according to the present invention showing a typical installation of an outlet box 100 in a concrete wall application. FIG. 3 shows a side view of the electrical box 100 encased within forms 302 and 304. The front form 302 and rear form 304 are used to retain poured concrete 306 to construct a vertical wall. As is well known, such forms may be constructed of wood stud, planks or sheets such as plywood. Electrical box 100 is fastened to front form 302. The outlet box 100 must be securely fastened to the form when the concrete 306 is poured. The electrical box 100 is nailed to the form by driving the nails 116, 118 through apertures provided on exterior collars 119 of electrical box into the form. Secure attachment of the box 100 to the form 302 maintains the box 100 in proper position during the concrete pour.

Also shown in FIG. 3 is a ground screw 308, which is positioned at the rear of the electrical box 100 along back wall 102 for attaching a ground connection to an electrical device installed in electrical box 100. Also visible in the side view are nails 116 which pass through collar 119. A wire is inserted into the electrical box 100 through knockout holes 114, which would be fitted with a connector (not shown). The wire would typically be inserted through a conduit (not shown) which would be fastened to the connector. The wires can be installed before or after the concrete is poured. It should be noted that the wire can be routed into the electrical box through knockout holes 114 positioned on any wall of the electrical box, such as for example side wall 104 or back wall 102. In another embodiment, wires could also be affixed within electrical box 100 by way of a locking clamp (not shown) for firmly affixing the wire such as, for example Romex cable. The locking clamp would typically include a screw which is tightened to clamp the wire in place and prevent it from being pulled out during the construction process. The side view of FIG. 3 further shows extension 113 in a retracted position. Furthermore, as can be seen the extension 113 has a semicircular cutout 314 which corresponds to the position of the knockout hole 114. In that way, when the extension is in the retracted position as shown in FIG. 3, it does not interfere with the use of the knockout hole 114. Also seen in the side cross sectional view are protrusion 115 snaps of extension 113 and cavity 117 in side wall 104. In this view can be seen that when extension 113 is in the retracted position, protrusion 115 and cavity 117 are not cooperatively engaged, but are aligned such that the translational movement of extension 113 will bring protrusion 115 into cooperative engagement with cavity 117 to lock the extension 113 in place. Nails 116 and 118 are shown in an extended position, protruding through form 302, and thereby holding electrical box 100 flush against the form 302, such that when the form in removed, the box interior is accessible to the contractor to access wires and install electrical components.

Figure 4:
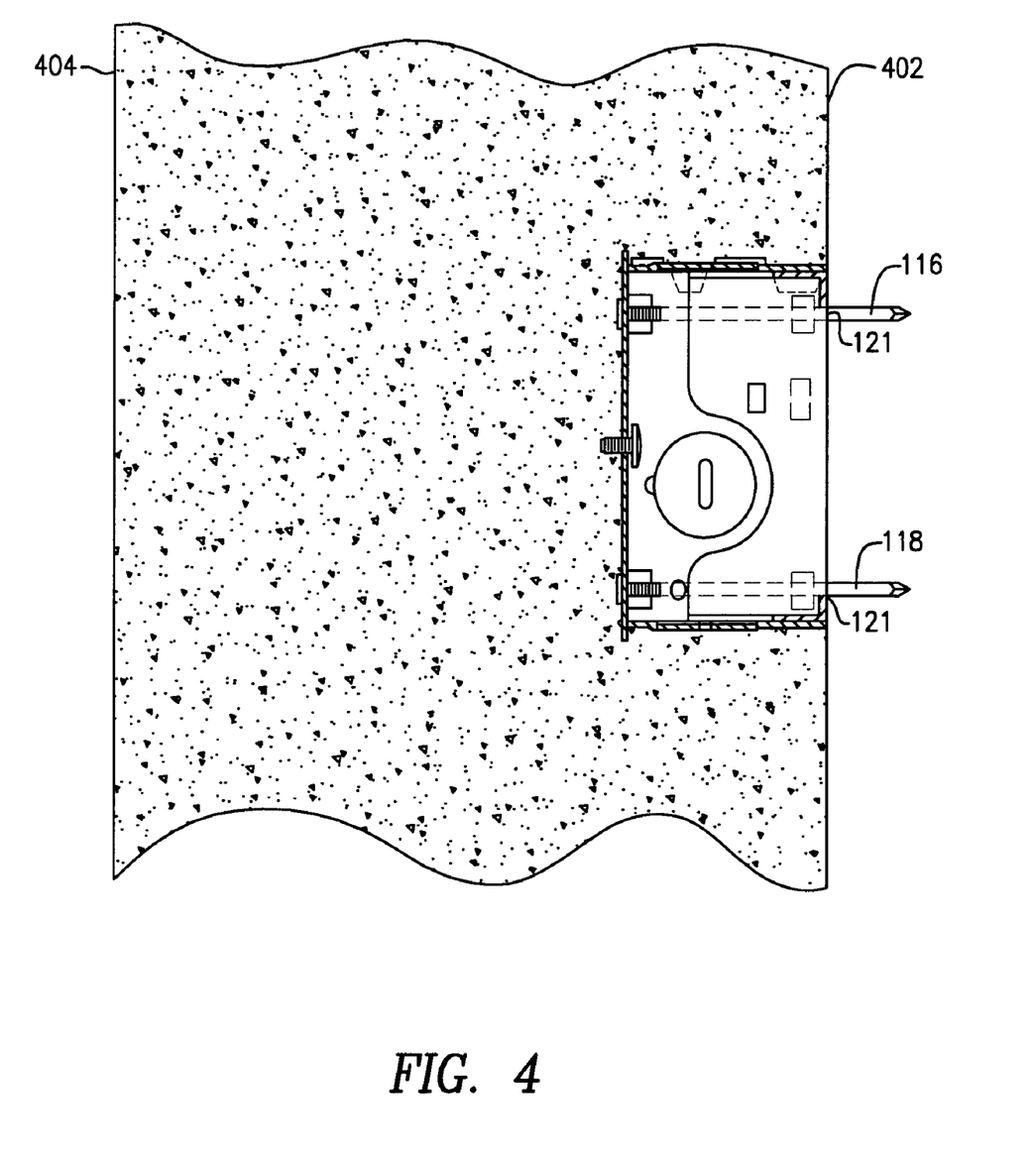
FIG. 4 is a cross sectional view of a typical installation of the electrical box of the current invention with the concrete forms removed along section 3-3 of FIG. 1.
Figure 9A:
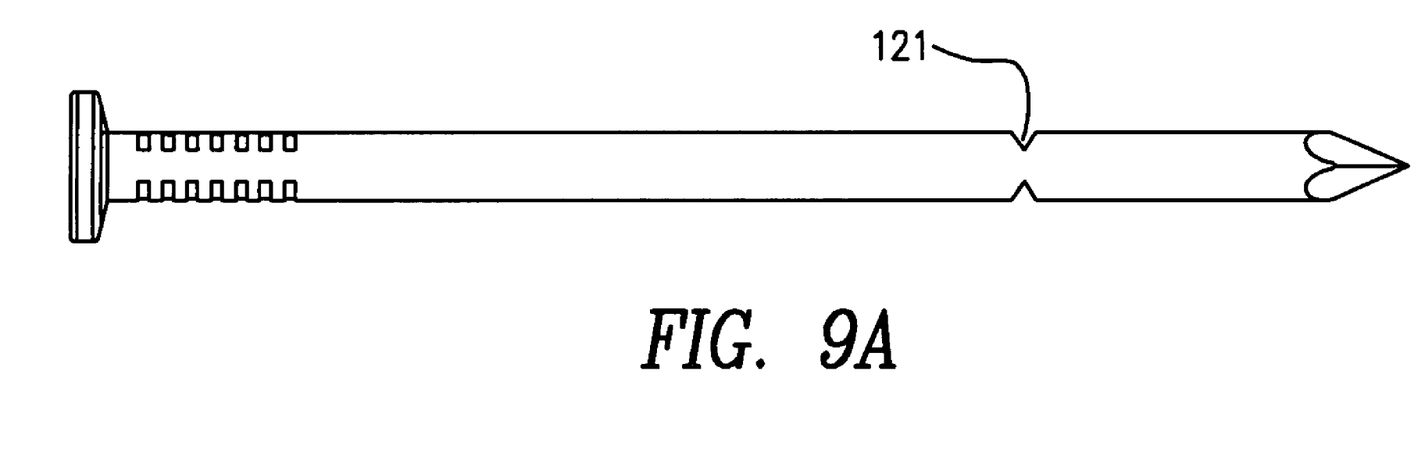
FIGS. 9A and 9B are close-up side and top views respectively of a component part of the electrical box according to the present invention.
Figure 9B:
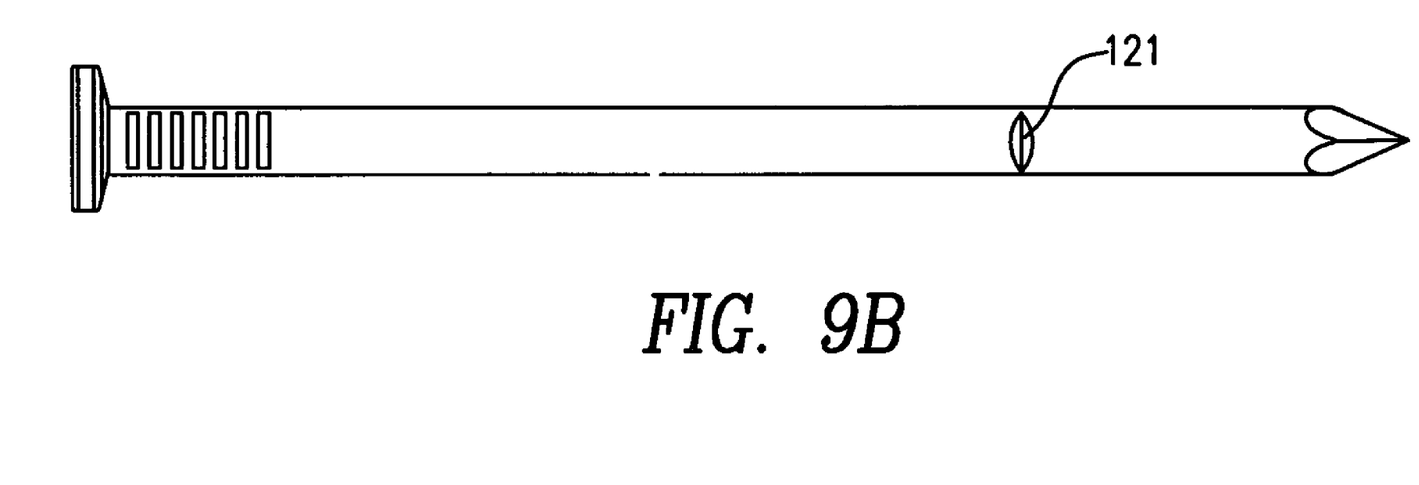

Turning now to FIG. 4, there is shown the electrical box 100 according to the present invention in a typical installation wherein the concrete has hardened, and the forms are removed. In this view the concrete wall front 402 and rear 404 surface are exposed. Removal of the forms also exposes the front of outlet box, as well as nails 116 and 118 used to affix the electrical box to front form 302. The removal of the forms exposes the shank and point of the nails 116 and 118. In accordance with the present invention, as will be explained further with reference to the FIG. 9, the shank of fastener nails 116 and 118 which extends beyond concrete front wall 402 can be removed by grasping the extended shank and forcibly bending the shank from side to side, thereby causing the shank to break at the stress raiser score mark or notch 121.

Figure 5:
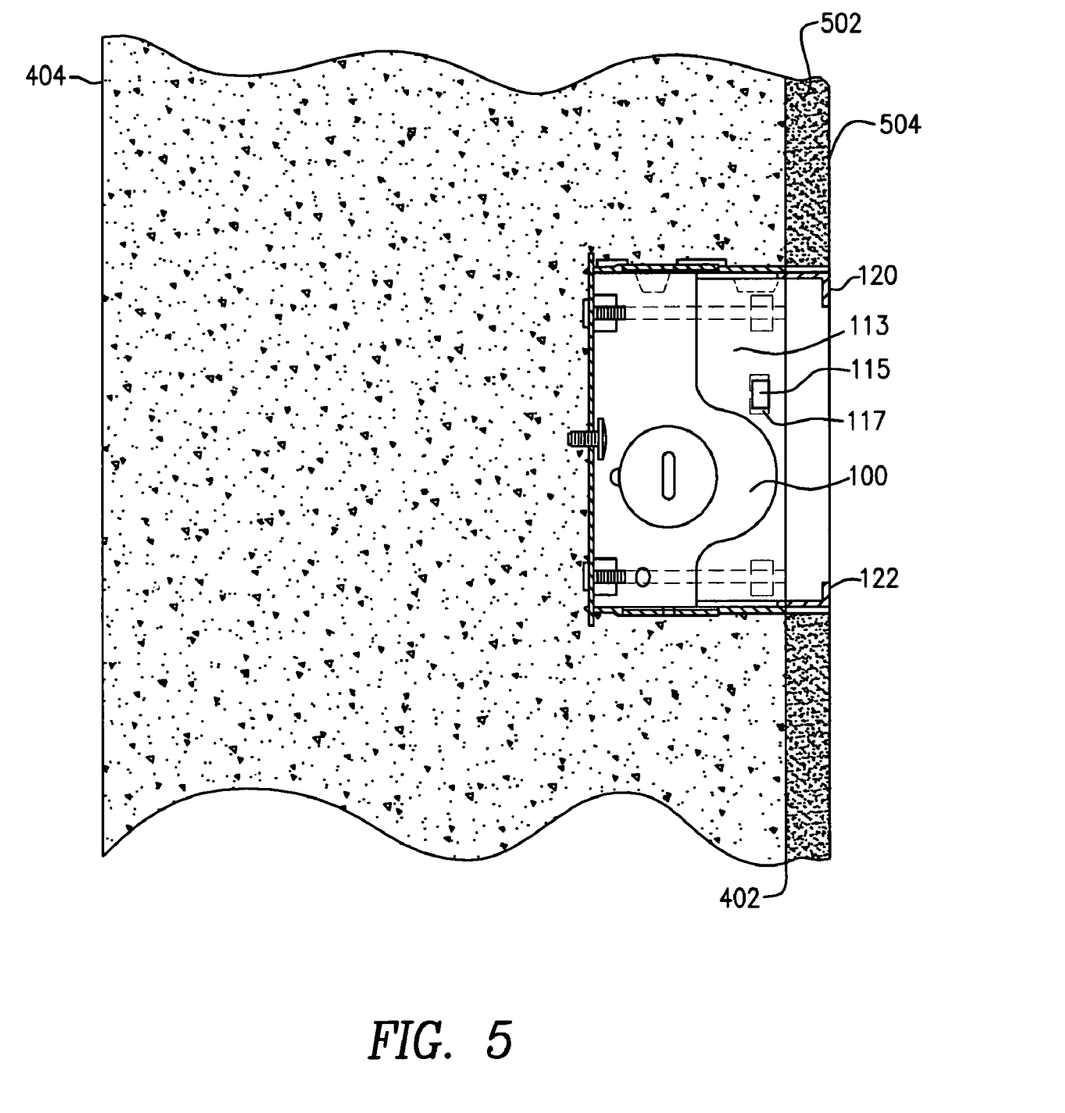
FIG. 5 is a cross sectional view of a typical installation of the electrical box of the current invention with a finish surface installed over the concrete along section 5-5 of FIG. 2.

Turning now to FIG. 5, there is shown a cross sectional view along section 5-5 of the electrical box 100 according to the present invention in a typical installation wherein the wall finishing material 502, such as for example sheetrock has been installed on wall front 402. In this view extension 113 is shown in the extended position, wherein protrusion 115 of extension 113 and cavity 117 in sidewall 104 are in cooperative engagement, thereby locking the extension 113 in place. To extend the electrical box according to the current invention, the contractor need only pull extension 113 out from the electrical box 100 and snap it in place by aligning the protrusion 115 with cavity 117. This process is easier and less time consuming than prior art methods, which require an extension piece to be affixed to the front of the electrical box usually by screwing the extension onto the electrical box. In the extended position, it can be seen that electrical box 100 flanges 120 and 122 are aligned with the outside plane 504 of wall finishing material 502. Furthermore, it can be seen that extension 113 extends electrical box 100 to fully cover the gap from the front open front face 112 to the outside plane 504 of finishing material 502 in conformance with electrical code requirements.

Figure 6:
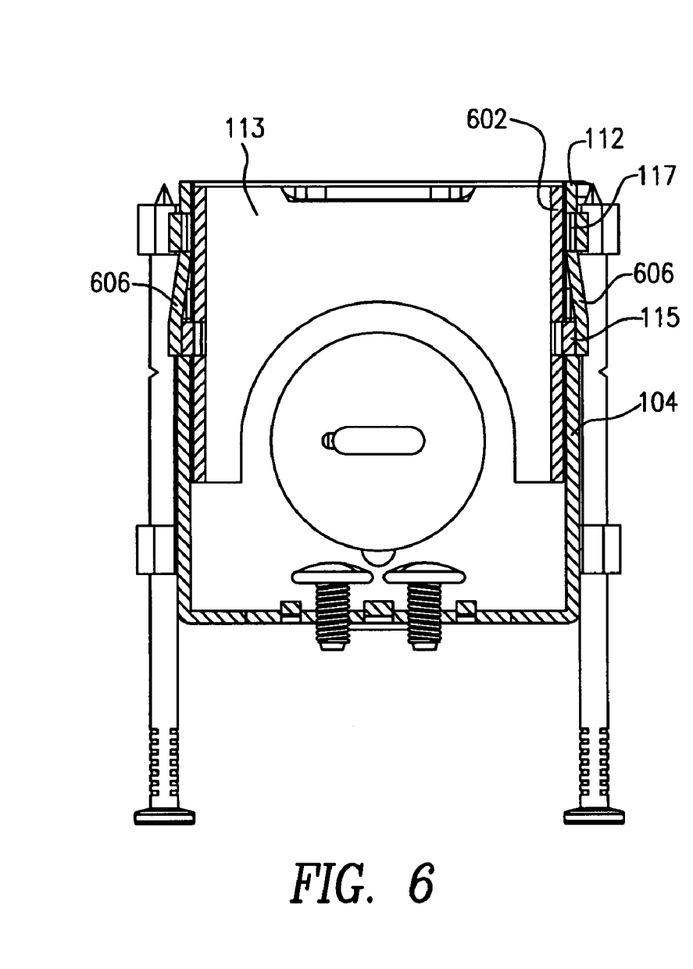
FIG. 6 is a top cross sectional view of the electrical box according to the present invention, with the slide extension in a retracted position along section 6-6 of FIG. 1.

Turning now to FIG. 6, there is shown top cross sectional view of electrical box 100 along section 6-6 of FIG. 1. In this view, extension 113 is shown in the retracted position, wherein protrusion 115 is visible extending from extension side wall 602, and into cavity 111 in electrical box sidewall 104. Protrusion 115 is formed of a resilient tab that angles slightly away from the plane of extension sidewall 602 and is biased to exert a force toward sidewall 104. In the retracted position, the extension is held in place by protrusion 115 cooperatively engaging cavity 111.

Cavity 117 is visible in sidewall 104, located toward open from face 112 with respect to protrusion 115. The cavity 117 corresponds in size to protrusion 115 such that when the translational movement of extension 113 moves protrusion 115 into alignment with cavity 117, the resilient tab moves outward into cavity 117 thereby locking extension 113 in the extended position. In addition, the wall 606 of cavity 111 is angled to provide a ramp for protrusion 115 to disengage from cavity 111 when the installer exerts a force on extension 113 to pull the extension out from electrical box 100. In this way the force required to pull out the extension is minimized, while still securely locking the extension in the retracted position prior to use.

Figure 7:
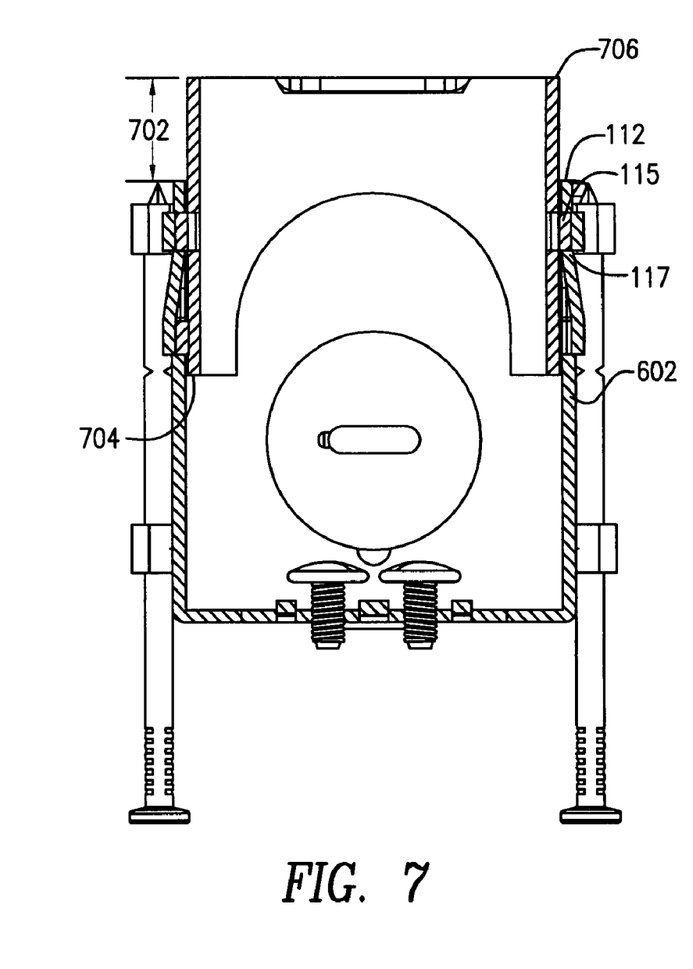
FIG. 7 is a top cross sectional view of the electrical box according to the present invention, with the slide extension in an extended position along section 7-7 of FIG. 2.

Turning now to FIG. 7, there is shown top cross sectional view of electrical box 100 along section 7-7 of FIG. 2. In this view, extension 113 is shown in the extended position, wherein protrusion 115 is visible extending from extension sidewall 602, into cavity 117 thereby locking extension 113 in the extended position. As is depicted in FIGS. 6 and 7, the distance 702 that extension 113 extends from open front face 112 corresponds to the positioning of protrusion 115 and cavity 117. The placement of protrusion 115 can thus be modified to provide for a longer or shorter extension distance 702. The closer to the inside edge 704 of extension 113 that protrusion is placed, the longer the distance 702 from open front face 112 of electrical box 100 to the extension front edge 706. In this way, the electrical box 100 according to the present invention can be adapted to use for various thickness finishing material 502. It is typical that sheetrock of ½", ⅝" or ¾" is used in most applications, however other variations are possible. For example, the electrical box 100 according to the current invention can be adapted for use where sheetrock is overlaid with another material such as ceramic or stone tile. In this type of application, protrusions 115 will be located on extension sidewall 602 at a distance from inside edge 704 such that extension 113 extends to a distance corresponding to the depth of the finish material layers 502.

Figure 8:
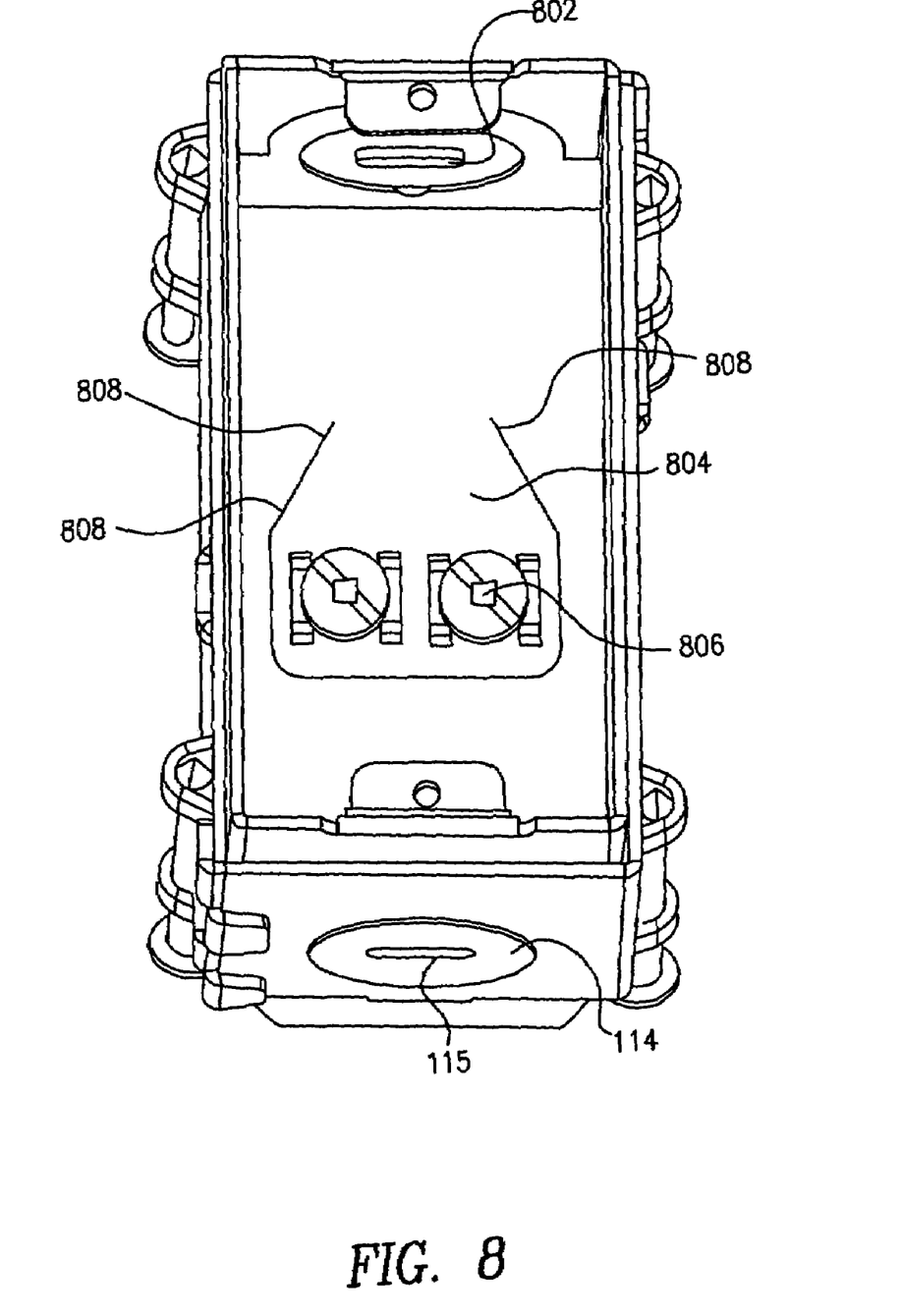
FIG. 8 is a perspective view of the interior of the electrical box according to the present invention.

Turning now to FIG. 8, there is shown a front perspective view of the electrical box 100 according to the current invention. Shown in this view is the electrical box interior 110. In this view, knockouts 114 are visible on the top 106 and bottom 108 of electrical box 100. All knockouts on the box according to the present invention are design to withstand the conditions specific to the use of electrical boxes in a concrete wall. All knockouts 114 are punched to the outside of electrical box 100, to prevent the knockout opening from the force of the poured concrete pressing against the outside of the electrical box during construction. Furthermore, as previously mentioned, knockouts 114 incorporate a smaller oval or oblong shaped knockout 127 located centrally within knockouts 114. Knockouts 127 are punched to the inside of the box to facilitate its opening by the contractor, and are adapted to receive a flat head screw driver blade. The contractor installing an electrical box according to the current invention can therefore have a sealed electrical box that will prevent concrete from infiltrating into the box interior 110. Once the contractor has removed knockout 127 the contractor can use the oblong hole obtained to pry open knockout 114 with a screw driver.

Also shown in FIG. 8 is a movable ground screw mounting tab 804 for mounting grounding screws 806, located on back wail 102. Tab 804 is comprised of a frangible slit 808 on back wall 102. The tab 804 provides the contractor with additional room to secure the ground wire to the electrical box, once the concrete has been poured and hardened. In typical conditions it is difficult to screw the grounding screws in fully to where the head touches the bottom of the box because the screw cannot penetrate the hardened concrete outside the box. To eliminate that difficulty, the movable ground screw mounting tab 804 in the electrical box 100 according to the present invention can be bent forward by the user after the box is installed and the concrete hardened. In that way, there will be enough room behind the screws to fully screw in the grounding screws and affix the ground wires.

Turning to FIG. 9 there is a shown a close-up view of side view 9A and top view 9B of nails 116 and 118 used to secure electrical box 100 to a concrete form by driving the nails into the form prior to the concrete being poured. Each nail 116, 118 is scored 121 to create stress raiser. In side view 9A, the score 121 is shown as a "v" shaped cut extending partially through the shank of nails 116 and 118 and creates a stress raiser, which can be seen in FIG. 9B as a slit in the side of nails 116 and 118. The stress raiser is used to facilitate breaking the nail after the form has been removed and the electrical box 100 set in concrete. To that end, the score mark 121 is positioned along the nails' length such that it corresponds to the open front face 112 when the nail is fully extended into the form. In that way, when the form is removed, the score mark is even with the cured concrete and can be broken off flush with the concrete wall.

Figure 10:
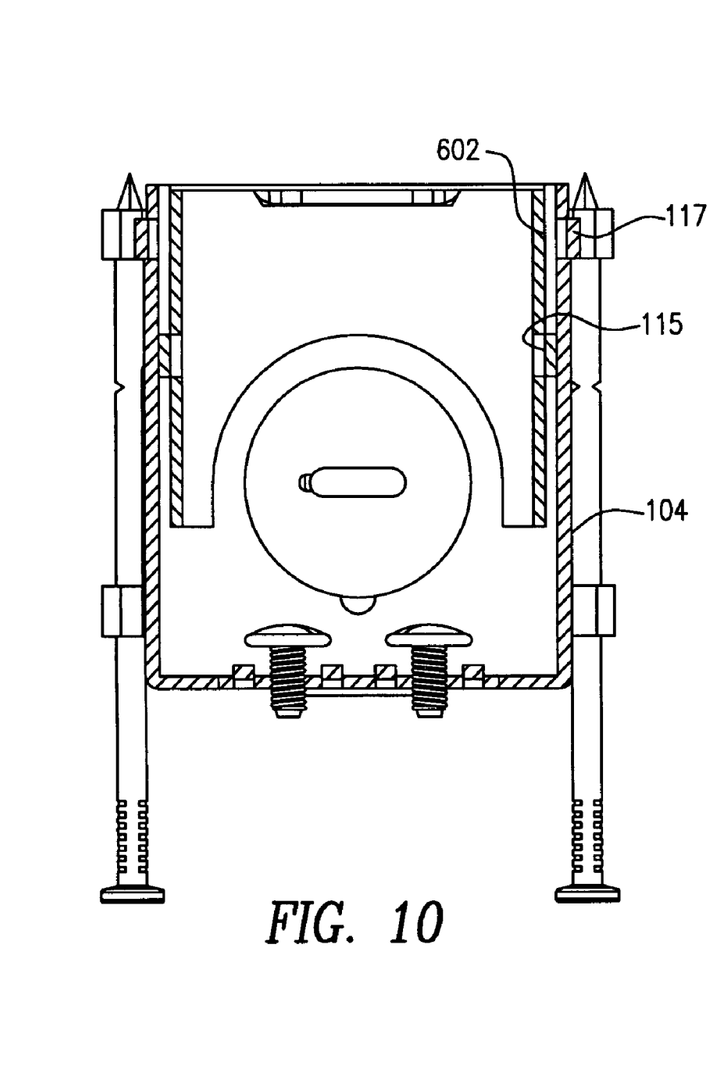
FIG. 10 is a cross sectional perspective view of an alternate embodiment of the electrical box of the current invention, with the slide extension in a retracted position along section 6-6 of FIG. 1.

Turning now to FIG. 10, there is shown top cross sectional view of an alternate embodiment of electrical box 100 along section 6-6 of FIG. 1. In this view, extension 113 is shown in the retracted position, wherein protrusion 115 is visible extending from extension side wall 602, and bearing against electrical box sidewall 104. Protrusion 115 is formed of a resilient tab that angles slightly away from the plane of extension sidewall 602 and is biased to exert a force against sidewall 104. In the retracted position, the extension is held in place by the friction between protrusion 115 and sidewall 104.

Cavity 117 is visible in sidewall 104, located toward open from face 112 with respect to protrusion 115. The cavity 117 corresponds in size to protrusion 115 such that when the translational movement of extension 113 moves protrusion 115 into alignment with cavity 117, the resilient tab moves outward into cavity 117 thereby locking extension 113 in the extended position.

Figure 11:
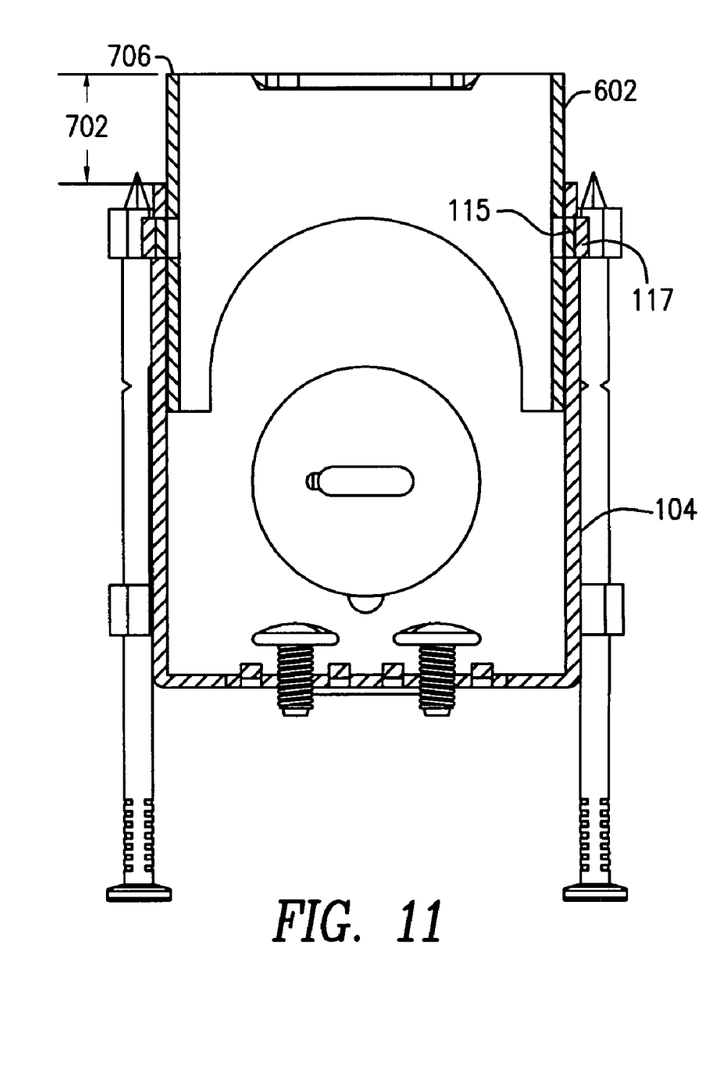
FIG. 11 is a cross sectional perspective view of an alternate embodiment of the electrical box of the current invention, with the slide extension in an extended position along section 7-7 of FIG. 2.

Turning now to FIG. 11, there is shown top cross sectional view of electrical box 100 along section 7-7 of FIG. 2. In this view, extension 113 is shown in the extended position, wherein protrusion 115 is visible extending from extension sidewall 602, into cavity 117 thereby locking extension 113 in the extended position. As is depicted in FIGS. 6 and 7, the distance 702 that extension 113 extends from open front face 112 corresponds to the positioning of protrusion 115 and cavity 117. The placement of protrusion 115 can thus be modified to provide for a longer or shorter extension distance 702. The closer to the inside edge 704 of extension 113 that protrusion is placed, the longer the distance 702 from open front face 112 of electrical box 100 to the extension front edge 706. In this way, the electrical box 100 according to the present invention can be adapted to use for various thickness finishing material 502. It is typical that sheetrock of ½", ⅝" or ¾" is used in most applications, however other variations are possible. For example, the electrical box 100 according to the current invention can be adapted for use where sheetrock is overlaid with another material such as ceramic or stone tile. In this type of application, protrusions 115 will be located on extension sidewall 602 at a distance from inside edge 704 such that extension 113 extends to a distance corresponding to the depth of the finish material layers 502.

Figure 12:
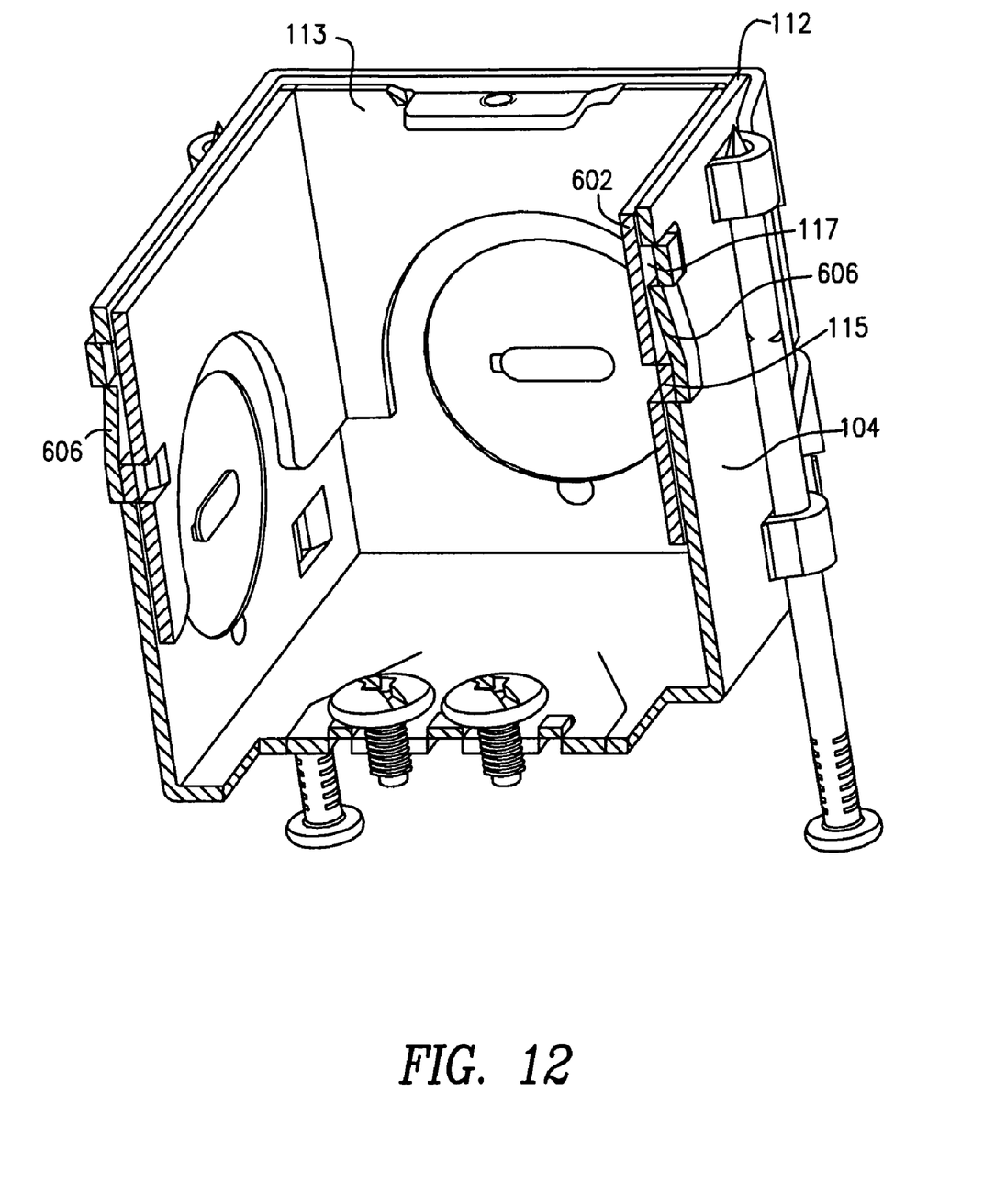
FIG. 12 is a perspective cross sectional view of the electrical box according to the present invention, with the slide extension in a retracted position along section 6-6 of FIG. 1.

Turning now to FIG. 12, there is shown a perspective view of the electrical box 100 along section 6-6 of FIG. 1. In this view, extension 113 is shown in the retracted position, wherein protrusion 115 is visible extending from extension side wall 602, and into cavity 111 in electrical box sidewall 104. Protrusion 115 is formed of a resilient tab that angles slightly away from the plane of extension sidewall 602 and is biased to exert a force toward sidewall 104. In the retracted position, the extension is held in place by protrusion 115 cooperatively engaging cavity 111.

Cavity 117 is visible in sidewall 104, located toward open from face 112 with respect to protrusion 115. The cavity 117 corresponds in size to protrusion 115 such that when the translational movement of extension 113 moves protrusion 115 into alignment with cavity 117, the resilient tab moves outward into cavity 117 thereby locking extension 113 in the extended position. In addition, the wall 606 of cavity 111 is angled to provide a ramp for protrusion 115 to disengage from cavity 111 when the installer exerts a force on extension 113 to pull the extension out from electrical box 100. In this way the force required to pull out the extension is minimized, while still securely locking the extension in the retracted position prior to use.

Figure 13:
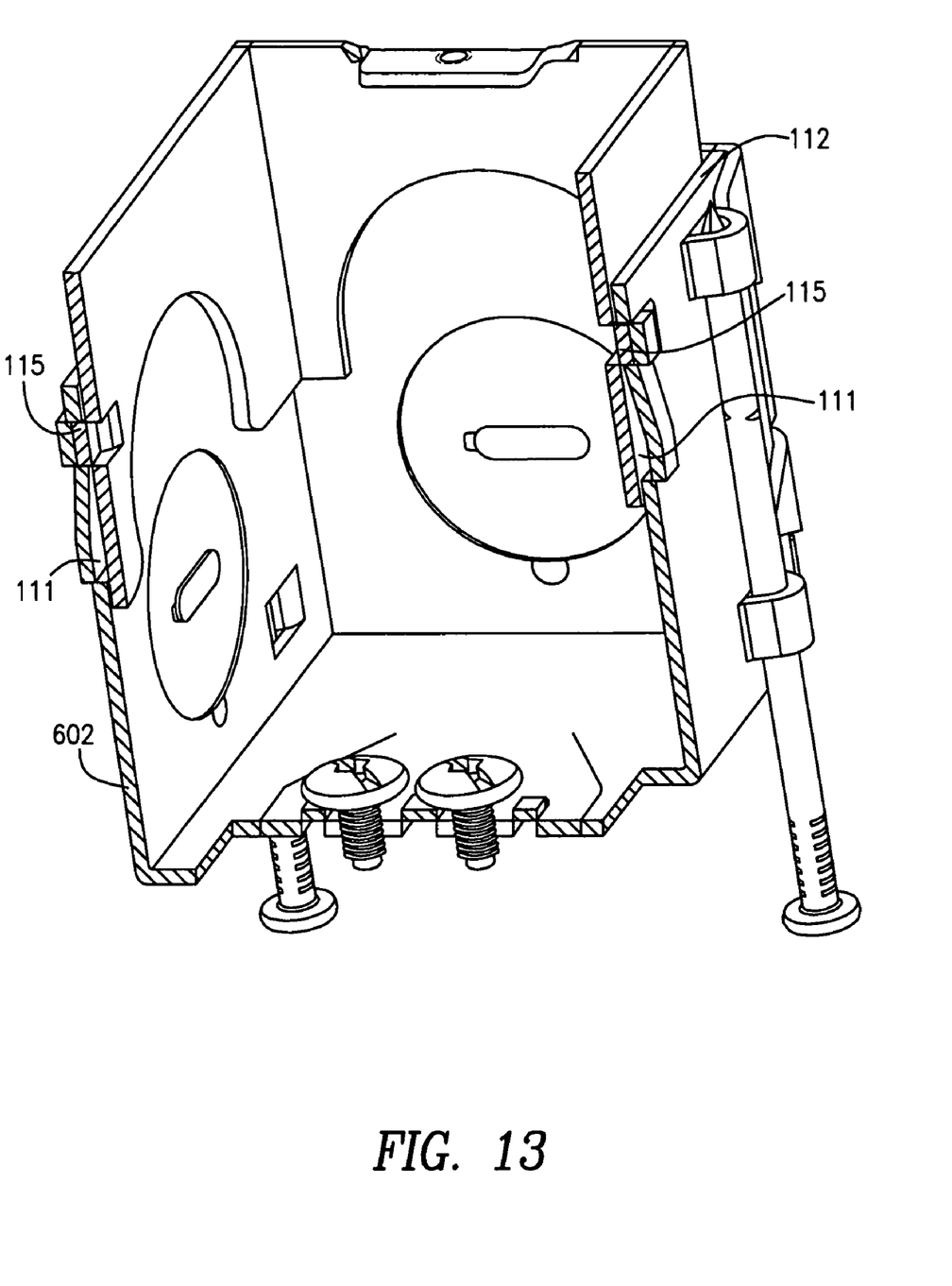
FIG. 13 is a perspective cross sectional view of the electrical box according to the present invention, with the slide extension in an extended position along section 7-7 of FIG. 2.

Turning now to FIG. 13, there is shown a perspective cross sectional view of electrical box 100 along section 7-7 of FIG. 2. In this view, extension 113 is shown in the extended position, wherein protrusion 115 is visible extending from extension sidewall 602, into cavity 117 thereby locking extension 113 in the extended position. As is depicted in FIGS. 6 and 7, the distance 702 that extension 113 extends from open front face 112 corresponds to the positioning of protrusion 115 and cavity 117. The placement of protrusion 115 can thus be modified to provide for a longer or shorter extension distance 702. The closer to the inside edge 704 of extension 113 that protrusion is placed, the longer the distance 702 from open front face 112 of electrical box 100 to the extension front edge 706. In this way, the electrical box 100 according to the present invention can be adapted to use for various thickness finishing material 502. It is typical that sheetrock of ½", ⅝" or ¾" is used in most applications, however other variations are possible. For example, the electrical box 100 according to the current invention can be adapted for use where sheetrock is overlaid with another material such as ceramic or stone tile. In this type of application, protrusions 115 will be located on extension sidewall 602 at a distance from inside edge 704 such that extension 113 extends to a distance corresponding to the depth of the finish material layers 502.

It will be appreciated that the present invention has been described herein with reference to certain preferred or exemplary embodiments. The preferred or exemplary embodiments described herein may be modified, changed, added to or deviated from without departing from the intent, spirit and scope of the present invention. It is intended that all such additions, modifications, amendments, and/or deviations be included within the scope of the claims appended hereto.

The invention claimed is:

1. An electrical outlet box for accommodating an electrical fixture comprising: a generally rectangular box having a back wall; a perimetrical side wall surrounding said back wall defining an open front face and a box interior; a slidable extension nested within said generally rectangular box, that can be moved from within said generally rectangular box to an extended position beyond said open front face, said slideable extension securable in said extended position beyond said open front face, and at least one resilient locking tab, said resilient locking tab configured to secure said slideable extension in said extended position beyond said open front, and at least one outwardly directed collar extending from one pair of parallel wall portions adjacent said open front face; and at least one movable fastening structure slideably held within said collar for rigidly mounting said electrical outlet box to a structural member.

2. An electrical outlet box of claim 1 having a movable mounting tab for accommodating a ground screw.

3. An electrical outlet box of claim 1, wherein said movable fastening structure has a notch for facilitating removal of a portion of said movable fastening structures.

4. An electrical outlet box of claim 3 wherein said notch is located at a predetermined point along said movable fastening structure that corresponds to the distance said fastening structure protrudes from a finished wall.

5. An electrical outlet box of claim 1, further including frangible elements on said side wall and said back wall for creating an opening into said box interior.

6. An electrical outlet box of claim 5, wherein said frangible elements are generally circular.

7. An electrical outlet box of claim 6, wherein said frangible elements include an oval shaped frangible port located approximately at the center of said frangible element.

8. An electrical outlet box of claim 1, wherein said extended position beyond said open front face is a predetermined distance that corresponds to the depth of a wall finish material.

* * * * *

UNITED STATES PATENT AND TRADEMARK OFFICE
CERTIFICATE OF CORRECTION

| | |
|---|---|
| PATENT NO. | : 7,449,633 B2 |
| APPLICATION NO. | : 11/512473 |
| DATED | : November 11, 2008 |
| INVENTOR(S) | : Valery Kagan et al. |

It is certified that error appears in the above-identified patent and that said Letters Patent is hereby corrected as shown below:

Col. 6,
In claim 3, line 4, "rower" should be "power".

Signed and Sealed this

Third Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,449,633 B2  Page 1 of 1
APPLICATION NO. : 11/512473
DATED : November 11, 2008
INVENTOR(S) : Daniel Lalancette et al.

It is certified that error appears in the above-identified patent and that said Letters Patent is hereby corrected as shown below:

This certificate supersedes the Certificate of Correction issued February 3, 2009. The certificate should be vacated since Certificate of Correction consists of errors to be corrected that does not correspond to text in printed patent. The corrections that belong to Patent No. 7,449,633 are as follows:

At column 5, lines 65-66, reads "...toward open from face 112..."; the patent should read --...toward open front face 112...--

At column 6, line 40, reads "...invention are design to withstand..."; the patent should read --...invention are designed to withstand...--

At column 7, lines 31-32, reads "...toward open from face 112..."; the patent should read --...toward open front face 112...--

At column 8, lines 5-6, reads "...toward open from face 112..."; the patent should read --...toward open front face 112.--

Signed and Sealed this

Twenty-fourth Day of February, 2009

JOHN DOLL
*Acting Director of the United States Patent and Trademark Office*